United States Patent
Gong et al.

(10) Patent No.: US 10,161,045 B2
(45) Date of Patent: Dec. 25, 2018

(54) METHOD FOR METALIZING POLYMER SUBSTRATE AND POLYMER ARTICLE PREPARED THEREOF

(71) Applicant: BYD COMPANY LIMITED, Shenzhen, Guangdong (CN)

(72) Inventors: Qing Gong, Shenzhen (CN); Wei Zhou, Shenzhen (CN); Yongliang Sun, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 95 days.

(21) Appl. No.: 15/217,717

(22) Filed: Jul. 22, 2016

(65) Prior Publication Data
US 2016/0326653 A1 Nov. 10, 2016

Related U.S. Application Data

(63) Continuation of application No. PCT/CN2015/071673, filed on Jan. 27, 2015.

(30) Foreign Application Priority Data

Jan. 27, 2014 (CN) .......................... 2014 1 0040525
Jan. 27, 2014 (CN) .......................... 2014 1 0040821
Jan. 27, 2014 (CN) .......................... 2014 1 0041075

(51) Int. Cl.
*B05D 3/00* (2006.01)
*C08J 7/18* (2006.01)
(Continued)

(52) U.S. Cl.
CPC ............ *C23C 18/1862* (2013.01); *C08K 3/20* (2013.01); *C23C 18/1603* (2013.01);
(Continued)

(58) Field of Classification Search
CPC ............ C23C 18/1862; C23C 18/1868; C23C 18/1603; C23C 18/1608; C23C 18/1612;
(Continued)

(56) References Cited

U.S. PATENT DOCUMENTS

2007/0059449 A1* 3/2007 Ryu .................... C23C 18/1653
427/299
2010/0258769 A1* 10/2010 Krietsch ............... C09C 1/0015
252/519.4
(Continued)

FOREIGN PATENT DOCUMENTS

CN 103088321 A 5/2013
CN 103741125 A 4/2014
(Continued)

OTHER PUBLICATIONS

International Search Report and Written Opinion for Application No. PCT/CN2015/071673, dated May 6, 2015, 13 pages.

*Primary Examiner* — Michael P Wieczorek
(74) *Attorney, Agent, or Firm* — Sheppard Mullin Richter & Hampton LLP

(57) ABSTRACT

A method for metalizing a polymer substrate and a polymer article prepared by the method are provided. First, a polymer substrate having a base polymer and at least one metal compound dispersed in the base polymer is provided. Then, a surface of the polymer substrate is irradiated with an energy beam such that a water contact angle of the surface of the polymer substrate is at least 120°. The surface of the polymer substrate is then subjected to chemical plating.

19 Claims, 1 Drawing Sheet

(51) Int. Cl.
*G21H 5/00* (2006.01)
*C23C 18/18* (2006.01)
*C23C 18/16* (2006.01)
*C23C 18/20* (2006.01)
*C23C 18/40* (2006.01)
*C08K 3/20* (2006.01)
*C23C 18/36* (2006.01)
*C23C 18/54* (2006.01)
*C08K 3/22* (2006.01)

(52) U.S. Cl.
CPC ...... *C23C 18/1608* (2013.01); *C23C 18/1612* (2013.01); *C23C 18/1641* (2013.01); *C23C 18/1653* (2013.01); *C23C 18/18* (2013.01); *C23C 18/1851* (2013.01); *C23C 18/204* (2013.01); *C23C 18/40* (2013.01); *C08K 2003/2248* (2013.01); *C08K 2003/2262* (2013.01); *C08K 2003/2265* (2013.01); *C23C 18/1651* (2013.01); *C23C 18/36* (2013.01); *C23C 18/54* (2013.01)

(58) Field of Classification Search
CPC . C08K 3/22; C08K 3/2279; C08K 2003/2231
See application file for complete search history.

(56) References Cited

U.S. PATENT DOCUMENTS

| | | | |
|---|---|---|---|
| 2011/0086204 A1* | 4/2011 | Wohl, Jr. ........... | B23K 26/0081 428/156 |
| 2012/0276390 A1* | 11/2012 | Ji ........................ | H05K 3/185 428/412 |
| 2013/0168133 A1 | 7/2013 | Schrauwen | |
| 2014/0002311 A1* | 1/2014 | Takano .................. | C08J 5/043 343/700 MS |

FOREIGN PATENT DOCUMENTS

| | | | | |
|---|---|---|---|---|
| CN | 103757615 A | 4/2014 | | |
| CN | 103774123 A | 5/2014 | | |
| CN | 104178751 A | 12/2014 | | |
| WO | WO-2013055786 A1 * | 4/2013 | ......... | C23C 18/1607 |

* cited by examiner

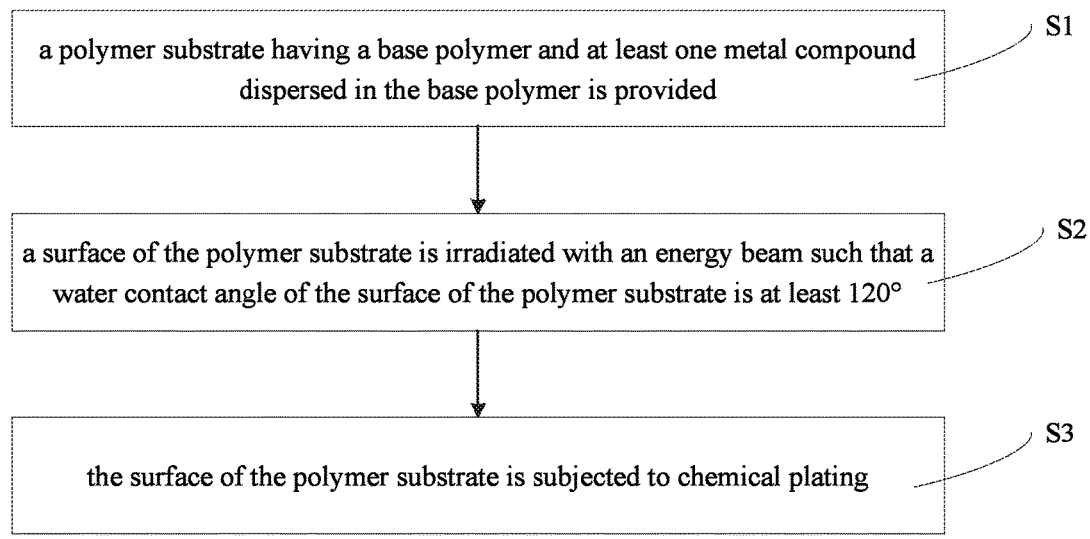

METHOD FOR METALIZING POLYMER SUBSTRATE AND POLYMER ARTICLE PREPARED THEREOF

CROSS-REFERENCE TO RELATED APPLICATIONS

This application is a continuation application of International Application No. PCT/CN2015/071673, filed on Jan. 27, 2015, which is based on and claims priority to and benefits of Chinese Patent Application Nos. 201410040525.8, 201410040821.8 and 201410041075.4, all filed with the State Intellectual Property Office of P. R. China on Jan. 27, 2014. The entire contents of the above-identified applications are incorporated herein by reference.

FIELD

Embodiments of the present disclosure relate to a polymer metallization field, and more particularly to a method for metalizing a polymer substrate and a polymer article prepared by the method.

BACKGROUND

The technique of forming a metal layer on a polymer substrate in order to transmit electro-magnetic signals is widely used in fields like automobiles, computers, communications, etc. Selectively forming the metal layer on the surface of the polymer substrate is a key step in this technique.

One method for selectively metalizing a surface of a polymer substrate includes the following steps. First, a catalyst or accelerator for chemical plating is adhered on the surface of the polymer substrate which is to be plated. Then, metal ions in a metal solution for chemical plating are reduced to pure metal via an oxidation-reduction reaction, and the pure metal are deposited on the surface of the polymer substrate, thus forming a metal layer on the polymer substrate.

For example, Chinese Patent Application No. CN102752962A discloses a substrate provided with a metal layer and a manufacturing method of the substrate provided with the metal layer. The manufacturing method includes the steps of forming a hydrophilic region or a hydrophobic region on a surface of the substrate by performing surface treatment with plasma, and attaching a catalyst layer or an exchange layer or an isolating layer formed by organic or inorganic substances on the hydrophilic or hydrophobic surface of the substrate by using a surface treatment solution; then using a metal solution to form the metal layer on the surface of the catalyst layer or the exchange layer due to catalytic reaction or exchange reaction. The isolating layer can protect other regions from metal deposition, and the metal layer attached to the substrate can be patterned, so as to be used as a circuit contact or line. The manufacturing method, however, has disadvantages of complicated processing steps and weak adhesion between the metal layer and the polymer substrate.

Another method for selectively metalizing a surface of a polymer substrate includes the following steps. First, a polymer material is mixed with a catalyst or an accelerator for chemical plating or a precursor thereof, and molded to form a polymer substrate with the catalyst or accelerator or precursor thereof dispersed therein. Before the step of chemical plating, a surface of the polymer substrate is irradiated with an energy beam such as a laser, such that a part of polymer material in the irradiated surface is gasified and the catalyst or accelerator or precursor thereof is exposed. Then, chemical plating is performed on the irradiated surface to form a metal layer on the surface of the polymer substrate. In case the precursor is used, the precursor can be activated by the energy beam to form the catalyst or accelerator.

For example, U.S. Patent Application Publication No. 2004/0241422A1 discloses a method for preparing a polymer article, which includes steps of: adding an inorganic compound having a spinel structure and containing Cu, Ni, Co, Cr, Fe, etc. to a polymer matrix, and activating the inorganic compound with an ultraviolet laser (with wavelengths of 248 nm, 308 nm, 355 nm, 532 nm) and an infrared laser (with wavelengths of 1064 nm and 10600 nm). Specifically, the patent mentions that the oxides having spinel structures should be reduced into metal under the effect of the laser. Then, the metal may act as a crystal core, onto which metal may be deposited during a chemical plating process so as to form a metal layer. However, the energy of the laser has to be high enough to reduce the oxides having the spinel structure into pure metal. Therefore, the method has on the one hand serious damage on the polymer matrix, and on the other hand the adhesion between the metal layer and the substrate is weak.

As another example, Chinese Patent Application No. CN103313523A discloses a manufacturing method for an electronic circuit. The manufacturing method includes the following steps of: preparing a circuit carrier, wherein the circuit carrier is made of a high-molecular compound and a water repellent agent is added in the high-molecular compound; carrying out selective electromagnetic irradiation on the surface of the circuit carrier to form a hydrophilic area; and carrying out electroplating or chemical plating on the circuit carrier to enable a metal material to be attached in the hydrophilic area and form the electronic circuit.

As described above, methods for selectively metalizing a surface of a polymer substrate still need to be modified. In terms of these methods, it is generally believed that the oxidation-reduction reaction mainly takes place on the hydrophilic surface, while it is difficult to form a complete metal layer on the hydrophobic surface.

SUMMARY

Embodiments of the present disclosure seek to solve at least one of the problems existing in the prior art to at least some extent.

Embodiments of a first broad aspect of the present disclosure provide a method for metalizing a polymer substrate. The method for metalizing a polymer substrate according to embodiments of the present disclosure may include steps of: providing a polymer substrate having a base polymer and at least one metal compound dispersed in the base polymer; irradiating a surface of the polymer substrate with an energy beam such that a water contact angle of the surface of the polymer substrate is at least 120°; and performing chemical plating on the surface of the polymer substrate. In some embodiments, the base polymer contains a polymer having an ester and/or amide group in a backbone, and the metal compound includes a doped tin oxide doped with at least one doping element selected from vanadium, antimony, indium, and molybdenum.

With the method for metalizing a polymer substrate according to embodiments of the present disclosure, the plating speed during the chemical plating step may be fast.

In addition, the adhesion between a metal layer formed on the surface of the polymer substrate and the polymer substrate may be strong.

Embodiments of a second broad aspect of the present disclosure provide a polymer article prepared by the above-identified method. The polymer article according to embodiments of the present disclosure may include the polymer substrate and at least one metal layer formed on the surface of the polymer substrate. In some embodiments, the metal layer forms a predetermined pattern.

According to some embodiments of the present disclosure, the predetermined pattern corresponds to a structure of a circuit. With the metal layer formed as the predetermined pattern on the surface of the polymer substrate, the metal layer may act as a circuit for transmitting signals in various fields, such as communication field. In addition, the adhesion between the metal layer and the polymer substrate may be strong.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which:

FIG. 1 is a flow chart of a method for metalizing a polymer substrate according to an embodiment of the present disclosure.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure.

For the purpose of the present description and of the following claims, the definitions of the numerical ranges always include the extremes unless otherwise specified.

According to embodiments of a first aspect of the present disclosure, a method for metalizing a polymer substrate is provided. The method for metalizing a polymer substrate according to embodiments of the present disclosure may include steps of: providing a polymer substrate having a base polymer and at least one metal compound dispersed in the base polymer; irradiating a surface of the polymer substrate with an energy beam such that a water contact angle of the surface of the polymer substrate is at least 120°; and performing chemical plating on the surface of the polymer substrate. In some embodiments, the base polymer contains a polymer having an ester and/or amide group in a backbone, and the metal compound includes a doped tin oxide doped with at least one doping element selected from vanadium, antimony, indium, and molybdenum.

The inventors of the present disclosure have found that, irradiation of a surface of a polymer substrate having catalysts or accelerators or precursors thereof dispersed therein may provide the irradiated surface with activity that enables metals to deposit on this irradiated surface in a chemical plating step. If the irradiation condition is such that the irradiated surface has a water contact angle of at least 120° C., the irradiated surface has not only the activity for chemical plating, the adhesion between metals deposited on the polymer substrate (i.e. a metal player formed therefrom) and the polymer substrate may be stronger.

As shown in FIG. 1, the method for metalizing a polymer substrate according to embodiments of the present disclosure may include steps S1-S3.

In the step S1, a polymer substrate having a base polymer and at least one metal compound dispersed in the base polymer is provided.

In some embodiments, the polymer substrate is provided by molding a mixture of the base polymer and the at least one metal compound.

In some embodiments, the base polymer contains a polymer having an ester group (i.e.

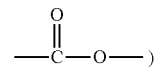

and/or an amide group (i.e.

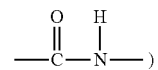

in a backbone. By way of example and without limits, the polymer having an ester group and/or amide group in the backbone includes a polyester and a polyamide. The polyester may refer to a polymer having an ester group in a backbone, and the polymer may be a copolymer or a homopolymer. The copolymer having an ester group in a backbone may be obtained by copolymerizing monomers capable of forming an ester group with monomers being not capable of forming an ester group. The polyamide may refer to a polymer having an amide group in a backbone, and the polymer may be a copolymer or a homopolymer. The copolymer having an amide group in a backbone may be obtained by copolymerizing monomers capable of forming an amide group with monomers being not capable of forming an amide group.

By way of example and without limitation, the polymer having an ester and/or amide group in the backbone may include at least one selected from a group including: polycarbonate, poly(1,4-cyclohexylenedimethylene terephthalate), poly(diallyl isophthalate), poly(diallyl terephthalate), poly(butylene naphthalate), poly(ethylene terephthalate), poly(butylene terephthalate), poly(hexamethylene terephthalamide), poly(nonamethylene terephthalamide), poly(hexamethylene adipamide), poly(hexamethylene azelamide), poly(hexamethylene succinamide), poly(hexamethylene lauramide), poly(hexamethylene sebacamide), poly(decamethylene sebacamide), poly(undecanoic amide), poly(lauramide), poly(octanamide), poly(9-aminononanoic acid), polycaprolactam, poly(phenylene terephthalamide), and poly(hexamethylene isophthalamide).

The amount of the polymer having an ester and/or amide group in the backbone may be determined based on the type of the polymer. In some embodiments, based on the total weight of the base polymer, the content of the polymer having an ester and/or amide group in the backbone is at least 50 wt %. Alternatively, based on the total weight of the base polymer, the content of the polymer having an ester and/or amide group in the backbone is at least 70 wt %. In this way, the adhesion between a metal layer formed in the subsequent chemical plating step and the polymer substrate may be stronger. Further alternatively, based on the total weight of the base polymer, the content of the polymer having the ester and/or amide group in the backbone is 100 wt %.

In some embodiments, in addition to the polymer having an ester and/or amide group in the backbone, the base polymer contains a polymer not having an ester and/or amide group in a backbone, which may be any conventional polymers. In some embodiments, the polymer not having an ester and/or amide group in the backbone may include at least one selected from a group including: polyolefin (such as polystyrene, polypropylene, poly(methyl methacrylate) and poly(acrylonitrile-butadiene-styrene)), poly(aromatic ether), polyether imide, polyphenylene oxide, polyphenylene sulphide, polyimide, polysulfone, poly(ether-ether-ketone), polybenzimidazole, phenol formaldehyde resin, urea formaldehyde resin, melamine-formaldehyde resin, epoxide resin and polyurethane. In some embodiments, the polyolefin may be modified to improve the compatibility between the polyolefin and the polymer having an ester and/or amide group in the backbone. For example, the polyolefin may be modified using maleic anhydride. The polymer having an ester and/or amide group in the backbone and the polymer not having an ester and/or amide group in the backbone may be mixed in a conventional way. Generally, these two polymers may be mixed by forming a polymer alloy.

The metal compound includes a doped tin oxide doped with at least one doping element selected from vanadium (V), antimony (Sb), indium (In), and molybdenum (Mo).

In some embodiments, based on the total amount of the doped tin oxide, the amount of the doping element calculated by oxides is about 0.1 mol % to about 15 mol %. Alternatively, the amount of the doping element calculated by oxides is about 1 mol % to about 10 mol %.

The doped tin oxide may be commercially available, or obtained by a conventional method in the related art. For example, the doped tin oxide may be prepared by mixing and sintering tin oxides and at least one compound of the doping element. The compound of the doping element may include an oxide of the doping element and/or a precursor capable of forming the oxide under sintering. The oxide of the doping element may be any compound formed by the doping element and the oxygen element. In some embodiments, the oxide of the doping element is at least one selected from a group including $V_2O_5$, $MoO_3$, $Sb_2O_3$, and $In_2O_3$. The precursor capable of forming the oxide of the doping element includes hydroxides of the doping elements and/or gels containing the doping elements, for example, vanadium hydroxide, a gel containing V, antimony hydroxide, a gel containing Sb, indium hydroxide, a gel containing In, molybdenum hydroxide, and a gel containing Mo. The sintering may be carried out in any conventional conditions. In an embodiment, the sintering is carried out at a temperature of about 800° C. to about 1000° C., alternatively about 850° C. to about 950° C. The sintering may be carried out for a time of about 1 h to about 6 h. The sintering may be carried out in an oxygen containing atmosphere or a non-reactive atmosphere. In an embodiment, the compound of the doping element is the precursor capable of forming the oxide of the doping element under sintering, and the sintering is carried out in an oxygen containing atmosphere.

There are no particular limitations for the particle diameter of the metal compound, provided a compact polymer substrate is formed. For example, the metal compound may have a volume average particle diameter of about 0.1 μm to about 5 μm, alternatively about 0.4 μm to about 2 μm.

There are no particular limitations for the amount of the metal compound in the polymer substrate, provided at least one metal layer may be formed on the polymer substrate by chemical plating after the polymer substrate is irradiated with the energy beam. In some embodiments, based on the total weight of the polymer substrate, the content of the metal compound may be about 0.1 wt % to about 30 wt %, alternatively about 10 wt % to about 30 wt %.

In some embodiments, at least one additive may be added in the polymer substrate. In other words, the mixture of the base polymer and the metal compound may further contain at least one additive. In some embodiments, the additive can be, for example, a filler, an antioxidant, and a light stabilizer and so on. With the addition of the additive, the performance and property of the polymer article prepared by the method according to embodiments of the present disclosure may be improved, or even new performances may be provided to the polymer article. There are no special limits for the content and the type of the additive, which may be selected according to, for example, practical requirements.

The filler used as the additive may be any filler which is non-reactive under the effect of the energy beam (either physically or chemically), such as laser. In some embodiments, the filler may be at least one selected from talc and/or calcium carbonate. In some embodiments, the filler may be glass fiber. With the addition of glass fiber, the depth of a recess, formed by the energy beam such as a laser, in the surface of the polymer substrate may be significantly increased, which may facilitate the deposition of a metal (for example, copper) during the subsequent chemical plating process. In some embodiments, the filler may include at least one selected from a group including micro glass bead, calcium sulfate, barium sulfate, titanium dioxide, pearl powder, wollastonite, diatomite, caoline, pot clay, mica, oil shale ash, aluminum silicate, alumina, silica and zinc oxide.

The antioxidant used as the additive may be any conventional antioxidant in the related art. In some embodiments, the antioxidant may contain a primary antioxidant and a secondary antioxidant. The ratio between the primary antioxidant and the secondary antioxidant may be appropriately selected according to, for example, the type of the antioxidant. In some embodiments, the weight ratio between the primary antioxidant and the secondary antioxidant may be about 1:1 to about 1:4. In some embodiments, the primary antioxidant may be a hindered phenol antioxidant. By way of example but without limits, in some embodiments, the primary antioxidant may be antioxidant 1098 or antioxidant 1010, in which the antioxidant 1098 mainly contains 3,3'-bis(3,5-di-tert-butyl-4-hydroxyphenyl)-N,N'-hexamethylenedipropionamide and the antioxidant 1010 mainly contains pentaerythritol tetrakis(3-(3,5-di-tert-butyl-4-hydroxyphenyl)propionate). In some embodiments, the secondary antioxidant may be of a phosphite type. By way of example and without limits, in some embodiments, the secondary antioxidant may be antioxidant 168, which mainly contains tris(2,4-di-tert-butyl-phenyl)phosphite. With the antioxidant, the oxidation resistance of the polymer substrate may be improved, whereby the life of the polymer substrate may be improved.

In some embodiments, the light stabilizer used as the additive may be of the hindered amine type. In some embodiments, the light stabilizer may be bis(2,2,6,6-tetramethyl-4-piperidyl)sebacate. The light stabilizer may be any known ones in the related art, without special limits in the present disclosure.

In some embodiments, the amount of the additive may be appropriately selected according to functions and types of the additives. In some embodiments, based on 100 weight parts of the polymer substrate, the content of the filler may range from 1 weight part to 40 weight parts, the content of the antioxidant may range from about 0.01 weight parts to about 1 weight part, the content of the light stabilizer may range from about 0.01 weight parts to about 1 weight part.

In some embodiments, the additive may further contain an additive for improving the processing performance of the prepared polymer article, such as a lubricant. In some embodiments, the lubricant may be at least one selected from a group including: ethylene/vinyl acetate copolymer (EVA wax), polyethylene (PE wax) and stearate. With the addition of the lubricant, the flowability of the polymer melt may be improved. In some embodiments, based on 100 weight parts of the mixture for forming the polymer substrate, the content of the lubricant ranges from about 0.01 weight parts to about 1 weight part.

For the aim of the present disclosure, other additives or components can be optionally added to the above polymer substrate in order to adapt it so as to satisfy specific practical requirements. The polymer article thus obtained should therefore be considered as being included in the scope of the present disclosure.

In some embodiments, the molding step may be performed by any conventional molding process known in the related art, without special limitations in the present disclosure. In some embodiments, the molding step is performed by injection molding. Before the step of injection molding, the mixture may be extruded and granulated. In another embodiment, the molding step is performed by extrusion molding.

In the step S2, a surface of the polymer substrate is irradiated with an energy beam such that a water contact angle of the surface of the polymer substrate is at least 120°.

In some embodiments, a predetermined area of the surface of the polymer substrate is irradiated with an energy beam such that a water contact angle of the surface of the polymer substrate is at least 120°. Then, metal layers formed in the subsequent chemical plating step may form a pattern on the surface of the polymer substrate. The pattern may be pre-designed in order to be used as, for example, a circuit for receiving and transmitting signals in the communication field.

With the method for metalizing a polymer substrate according to embodiments of the present disclosure, by irradiating the predetermined area, such as the area to be formed into a pattern, of the surface of the polymer substrate, on one hand, the base polymer in the predetermined area is gasified while the metal compound in this predetermined area is exposed, and on the other hand, the water contact angle of the surface of the polymer substrate becomes at least 120°. The inventors of the present disclosure have found that, when the irradiated surface of the polymer substrate has a water contact angle of at least 120°, a metal layer may be chemically plated onto the surface of the polymer substrate, and the adhesion between the metal layer and the polymer substrate is strong. In some embodiments, the water contact angle of the irradiated surface of the polymer substrate is at least 130°, for example, ranges from about 130° to about 160°. In this way, the adhesion between the metal layer and the polymer substrate may be stronger. In an embodiment, the irradiated surface of the polymer substrate has a water contact angle of at least 140°. In another embodiment, the irradiated surface of the polymer substrate has a water contact angle of below 150°.

The energy beam may include any conventional energy source that causes the base polymer to gasify and the metal compound to expose. In some embodiments, the energy beam may include at least one of a laser, an electron beam and an ion beam. There are no particular limits for the energy beam. The energy beam may be selected in accordance with types of the energy beam, the base polymer and the metal compound in the polymer substrate, provided the irradiated surface of the polymer substrate has the water contact angle as described above. In some embodiments, the energy beam is a laser. In some embodiments, the laser has a wavelength of about 157 nm to about 10.6 µm, alternatively about 532 nm to about 1064 nm. In some embodiments, the laser has a power of about 10 W to about 20 W, alternatively about 12 W to about 18 W. In some embodiments, the laser has a scanning speed of about 500 mm/s to about 8000 mm/s, alternatively about 4000 mm/s to about 6000 mm/s. In an embodiment, conditions of the laser includes: a step of about 3 µm to about 20 µm, a time delay of about 20 µs to about 100 µs, a frequency of about 10 kHz to about 400 kHz, and a filling spacing of about 10 µm to about 50 µm.

In the step S3, the surface of the polymer substrate is subjected to chemical plating.

In some embodiments, the method may further include a step of cleaning the surface of the polymer substrate, before the step S3. The cleaning step may be performed using any conventional cleaning process in the related art, such that residues and dirt adhered on the surface of the polymer substrate may be removed.

There are no particular limits for the chemical plating in embodiments of the present disclosure, and techniques and conditions of the chemical plating are well known to a person having ordinary skill in the art. In some embodiments, the chemical plating may be carried out with the following steps. The irradiated polymer substrate is immersed in an electroless Cu solution. In some embodiments, the electroless Cu solution may contain a Cu salt and a reducing agent and have a pH ranging from about 12 to about 13. The reducing agent may reduce Cu ions in the Cu salt into Cu metal. In some embodiments, the reducing agent may be at least one selected from a group including: glyoxylic acid, hydrazine, and sodium hypophosphite.

In some embodiments, the method may further include a step of electroplating or chemical plating, after the step S3. The electroplating or chemical plating may be performed for at least one time, so that additional metal layers, either of the same metal as or of different metal from the prior metal layers, may be formed on the prior metal layers. In some embodiments, a Cu layer is formed on the surface of the polymer substrate in the first chemical plating step (i.e. the step S3), then a Ni layer is formed on the Cu layer in the subsequent electroplating or chemical plating. With the additional Ni layer, oxidation of the Cu layer may be prevented.

With the method for metalizing a polymer substrate according to embodiments of the present disclosure, the adhesion between the polymer substrate and the metal layer is stronger, compared with the adhesion between the polymer substrate and the metal layer having the same thickness and formed by a conventional method. Therefore, metal layers formed on the predetermined area of the surface of the polymer substrate may act as a more reliable circuit.

Embodiments of another aspect of the present disclosure provide a polymer article prepared by the method for metalizing the polymer substrate mentioned above. The polymer article according to embodiments of the present disclosure includes the polymer substrate and at least one metal layer formed on the surface of the polymer substrate. In some embodiments, the metal layer forms a predetermined pattern.

It will be understood that the features mentioned above and those still to be explained hereinafter may be used not only in the particular combination specified but also in other combinations or on their own, without departing from the scope of the present disclosure.

Some illustrative and non-limiting examples are provided hereunder for a better understanding of the present disclosure and for its practical embodiment.

TEST

1. Method

Composition

The composition of the metal compound was measured by an inductively coupled plasma-atomic emission spectrometry (ICP-AES). The composition of the metal compound was calculated by oxides.

Water Contact Angle

The water contact angle of the irradiated surface of the polymer substrate was determined using an OCA20 contact angle tester commercially available from DATAPHYSICS Inc., Germany. 5 μL droplet of water was placed on a surface of the sample to be tested (i.e. the irradiated surface of the polymer substrate) using a syringe needle, and the droplet and the irradiated surface were imaged into a computer using an optical camera. Then, the water contact angle between the droplet and the irradiated surface was calculated. For each sample, 5 water contact angles were calculated, and the average value of the 5 water contact angles was recorded as the water contact angle of the irradiated surface of the polymer substrate.

Volume Average Particle Diameter

The volume average particle diameter of the metal compound was determined by a Laser Particle Sizer commercially available from Chengdu Jingxin Powder Analyse Instrument Co., Ltd., China.

Adhesion

The adhesion between the metal layer and the polymer substrate was determined by a cross-cut process. Specifically, a surface of the sample to be measured was cut using a cross-cut knife to form 100 grids (1 mm×1 mm). A gap between adjacent grids was formed to reach the bottom of the metal layer. Debris in the test region was cleaned using a brush, and then an adhesive tape (3M600 gummed paper) was sticked to grids in the test region. One end of the sticked adhesive paper was rapidly torn off in a vertical direction. Two identical tests were performed on the same grid region. The result of the adhesion was determined according to the following standard.

Grade 5B: the cut edge is smooth, and neither metal layers at the cut edge nor metal layers at the cut intersection of the grid peel off.

Grade 4B: the metal layers at the cut intersection partially peel off, but no more than 5% (area percent) of the metal layers peel off.

Grade 3B: the metal layers both at the cut edge and the cut intersection partially peel off, and 5% to 15% (area percent) of the metal layers peel off.

Grade 2B: the metal layers at both the cut edge and the cut intersection partially peel off, and 15% to 35% (area percent) of the metal layers peel off.

Grade 1B: the metal layers at both the cut edge and the cut intersection partially peel off, and 35% to 65% (area percent) of the metal layers peel off.

Grade 0B: the metal layers at both the cut edge and the cut intersection partially peel off, and more than 65% (area percent) of the metal layers peel off.

The results are shown in Table 1.

2. Examples

Example 1

The present example provides a method for metalizing a polymer substrate and a polymer article prepared thereof. The method includes the following steps.

1) Preparation of Polymer Substrate

Poly(hexamethylene adipamide), 10 mol % Sb-doped $SnO_2$, antioxidant 1076 and EVA wax having a weight ratio of 100:10:0.2:0.1 were mixed in a high-speed mixer to form a mixture, then the mixture was extruded and granulated in a twin screw extruder (from Nanjing Rubber and Plastics Machinery Plant Co., Ltd., China), and the granulated material was injection molded to obtain a polymer substrate having a size of 125 mm×15 mm×3 mm. The 10 mol % Sb-doped $SnO_2$ was prepared with the following steps. $SnO_2$ was grinded together with $Sb_2O_3$ and ethanol in a ball mill for 2 h, in which based on 100 weight parts of $Sb_2O_3$ and $SnO_2$, the amount of the ethanol was 300 weight parts; based on the total amount of $Sb_2O_3$ and $SnO_2$, the content of $Sb_2O_3$ was 10 mol %. The mixture thus obtained was dried at 80° C. in an air atmosphere for 3 h to obtain powders with a volume average particle diameter of 2.6 μm. The powders were calcined at 950° C. in an air atmosphere for 5 h, and the calcined product was grinded to obtain doped tin oxide particles having a volume average particle diameter of 1.6 μm. It was tested that the content of $Sb_2O_3$ in the doped tin oxide was 10 mol %.

2) Irradiation

A rectangular area having a dimension of 15 mm×8 mm of a surface of the polymer substrate was irradiated with an infrared laser (DPF-M12 from Shenzhen TETE Laser Technology Co., Ltd., China) under laser conditions of: a wavelength of 1064 nm, a scanning speed of 2000 mm/s, a step of 9 μm, a time delay of 20 μs, a frequency of 60 kHz, a power of 12 W, and a filling spacing of 50 μm. After that, the irradiated polymer substrate was cleaned with an ultrasonic cleaner and dried. The water contact angle of the irradiated surface of the polymer substrate was recorded in Table 1.

3) Chemical Plating

The polymer substrate obtained from the step 2) was subjected to chemical plating in an electroless Cu solution at 53° C. to form a Cu layer having a thickness of 3 μm on the irradiated surface of the polymer substrate. Then, the temperature of the electroless Cu solution was decreased to 45° C. and the chemical plating was continued, until the thickness of the Cu layer reached 13 μm. The polymer substrate formed with the Cu layer was subsequently subjected to chemical plating in an electroless Ni solution to form a Ni layer having a thickness of 3 μm on the Cu layer. Then, the polymer substrate formed with the Ni layer was subjected to flash plating in a gold solution to form a gold layer having a thickness of 0.03 μm on the Ni layer. The plating speed during chemical plating of Cu was listed in Table 1.

The electroless Cu solution contained 0.12 mol/L $CuSO_4.5H_2O$, 0.14 mol/L $Na_2EDTA.2H_2O$, 10 mg/L potassium ferrocyanide, 10 mg/L 2,2'-bipyridine, and 0.10 mol/L glyoxylic acid. The electroless Cu solution had a pH of 12.5 to 13 which was adjusted with NaOH and $H_2SO_4$.

The electroless Ni solution contained 23 g/L nickel sulphate, 18 g/L sodium hypophosphite, 20 g/L lactic acid, and 15 g/L malic acid. The electroless Ni solution had a pH of 5.2 which was adjusted with NaOH.

The gold solution was BG-24 neutral gold solution commercially available from Shenzhen Jingyanchuang Chemical Co., Ltd., China.

The adhesion between metal layers and the polymer substrate was recorded in Table 1.

Example 2

The present example provides a method for metalizing a polymer substrate and a polymer article prepared thereof. The method includes substantially the same steps as those in Example 1, with the exception that the power of the laser was 10 W (instead of 12 W) in the step 2).

Comparative Example 1

The present example provides a method for metalizing a polymer substrate and a polymer article prepared thereof. The method includes substantially the same steps as those in Example 1, with the exception that the power of the laser was 8 W (instead of 12 W) in the step 2).

Comparative Example 2

The present example provides a method for metalizing a polymer substrate and a polymer article prepared thereof. The method includes substantially the same steps as those in Example 1, with the exception that the rectangular area of the surface of the polymer substrate was polished (instead of being irradiated with laser) firstly with a 200# sandpaper and then with a 1500# sandpaper, and a recess formed in the polished area of the surface of the polymer substrate had a depth of 20 μm.

Comparative Example 3

The present example provides a method for metalizing a polymer substrate and a polymer article prepared thereof. The method includes substantially the same steps as those in Example 1, with the exception that the rectangular area of the surface of the polymer substrate was subjected to a sand blasting process (instead of being irradiated with laser) under conditions of: a sand of 150# white corundum, a sand blasting temperature of 40° C., a pressure of 80 psi, and a time period of 8 s.

Comparative Example 4

The present example provides a method for metalizing a polymer substrate and a polymer article prepared thereof. The method includes substantially the same steps as those in Example 1, with the exception that the rectangular area of the surface of the polymer substrate was subjected to chemical etching (instead of being irradiated with laser) under conditions of: 5 wt % HCl solution as an etching solution and an etching time of 30 min.

Comparative Example 5

The present example provides a method for metalizing a polymer substrate and a polymer article prepared thereof. The method includes substantially the same steps as those in Example 1, with the exception that maleic anhydride modified propylene (PP) in the same weight percent as poly (hexamethylene adipamide) was used instead of poly(hexamethylene adipamide) in the step 1).

The maleic anhydride modified PP was obtained by mixing PP, maleic anhydride (commercially available from Shanghai Ziyi Reagent Factory, China), and dicumyl peroxide having a weight ratio of 100:3:1 in a high-speed mixer to form a mixture, and extruding and granulating the mixture in a twin screw extruder (from Nanjing Rubber and Plastics Machinery Plant Co., Ltd., China).

Comparative Example 6

The present example provides a method for metalizing a polymer substrate and a polymer article prepared thereof. The method includes substantially the same steps as those in Example 1, with the exception that 10 mol % Ga-doped $SnO_2$ was used instead of 10 mol % Sb-doped $SnO_2$ to form the mixture in the step 1). The 10 mol % Ga-doped $SnO_2$ was prepared with the following steps. $SnO_2$ was grinded together with $Ga_2O_3$ and ethanol in a ball mill for 2 h, in which based on 100 weight parts of $Ga_2O_3$ and $SnO_2$, the amount of the ethanol was 300 weight parts; based on the total amount of $Ga_2O_3$ and $SnO_2$, the content of $Ga_2O_3$ was 10 mol %. The mixture thus obtained was dried at 80° C. in an air atmosphere for 3 h to obtain powders with a volume average particle diameter of 2.6 μm. The powders were calcined at 950° C. in an air atmosphere for 5 h, and the calcined product was grinded to obtain doped tin oxide particles having a volume average particle diameter of 1.6 μm. It was tested that the content of $Ga_2O_3$ in the doped tin oxide was 10 mol %.

The test results indicate that it is unable to form a complete metal layer on the polymer substrate.

Comparative Example 7

The present example provides a method for metalizing a polymer substrate and a polymer article prepared thereof. The method includes the following steps.

1) Preparation of Polymer Film

Pyromellitic dianhydride (PMDA), diamino diphenyl ether (ODA), 10 mol % Sb-doped $SnO_2$, and N,N-dimethyl acetamide (DAMC) having a weight ratio of 4:2.6:1:31 were used for preparing a polymer film with the following steps. Firstly, 256 g of DMAC was placed in a 1000 mL flask at 25° C., and 30 g of ODA was added into the flask under stirring. The stirring was kept for 1 h until the ODA was dissolved completely. Then, 35.76 g of PMDA was added into the flask under stirring, and the stirring was kept for 1 h. After that, 11.2 g of 10 mol % Sb-doped $SnO_2$ was added into the flask under stirring, and the stirring was kept for 30 min. Finally, the remaining PMDA was added into the flask to form a mixture having a viscosity of about 50000 mPa·s (25° C.).

The mixture was poured onto a 316 stainless steel strip to form a wet film. The stainless steel strip having the wet film thereon was heated in a furnace, and the temperature in the furnace was increased from 90° C. to 140° C. in 30 min. After the film peeled from the stainless steel strip, it was nailed on a stenter frame (heating furnace), with an edge of the film fixed.

Then, the film nailed on the stretching frame was heated to dryness (solid content >99 wt %), and the film passed through a drying box whose temperature was increased from 200° C. to above 360° C. in 30 min, so as to imidize the film and thus obtain a polymer film (polyimide film).
2) Irradiation The polymer film was subjected to the same irradiation as the step 2) of Example 1.

3) Chemical Plating

The polymer film was subjected to the same chemical plating as the step 3) of Example 1.

Example 3

The present example provides a method for metalizing a polymer substrate and a polymer article prepared thereof. The method includes substantially the same steps as those in Example 1, with the exception that a mixture of poly (hexamethylene adipamide) and maleic anhydride modified PP (prepared by the same process as described in Comparative Example 5) in the same weight percent as poly(hexamethylene adipamide) was used instead of poly(hexamethylene adipamide) in the step 1), and the weight ratio between the poly(hexamethylene adipamide) and the maleic anhydride modified PP in the mixture was 1:1.

Example 4

The present example provides a method for metalizing a polymer substrate and a polymer article prepared thereof. The method includes substantially the same steps as those in Example 1, with the exception that a mixture of poly (hexamethylene adipamide) and maleic anhydride modified PP (prepared by the same process as described in Comparative Example 5) in the same weight percent as poly(hexamethylene adipamide) was used instead of poly(hexamethylene adipamide) in the step 1), and the weight ratio between the poly(hexamethylene adipamide) and the maleic anhydride modified PP in the mixture was 7:3.

Example 5

The present example provides a method for metalizing a polymer substrate and a polymer article prepared thereof. The method includes substantially the same steps as those in Example 1, with the exception that the mixture was formed by polycarbonate (PC), 8 mol % V-doped $SnO_2$, antioxidant 168, and polyethylene wax having a weight ratio of 100:20: 0.5:0.2 (instead of a mixture formed by poly(hexamethylene adipamide), 10 mol % Sb-doped $SnO_2$, antioxidant 1076 and EVA wax having a weight ratio of 100:10:0.2:0.1) in the step 1). The 8 mol % V-doped $SnO_2$ was prepared with the following steps. $SnO_2$ was grinded together with $V_2O_5$ and ethanol in a ball mill for 4 h, in which based on 100 weight parts of $V_2O_5$ and $SnO_2$, the amount of the ethanol was 300 weight parts; based on the total amount of $V_2O_5$ and $SnO_2$, the content of $V_2O_5$ was 8 mol %. The mixture thus obtained was dried at 80° C. in an air atmosphere for 2 h to obtain powders with a volume average particle diameter of 1 μm. The powders were calcined at 900° C. in an air atmosphere for 5 h, and the calcined product was grinded to obtain doped tin oxide particles having a volume average particle diameter of 2 μm. It was tested that the content of $V_2O_5$ in the doped tin oxide was 8 mol %.

Example 6

The present example provides a method for metalizing a polymer substrate and a polymer article prepared thereof. The method includes substantially the same steps as those in Example 1, with the exception that the mixture was formed by PC, poly(ether-ether-ketone) (PEEK), 5 mol % In-doped $SnO_2$, calcium silicate fiber, antioxidant 1076 and polyethylene wax having a weight ratio of 70:30:10:10:0.2:0.1 (instead of a mixture formed by PC, $Cu_2P_2O_7$, antioxidant 1076 and EVA wax having a weight ratio of 100:5:0.5:0.2) in the step 1). The 5 mol % In-doped $SnO_2$ was prepared with the following steps. $SnO_2$ was grinded together with $In_2O_3$ and ethanol in a ball mill for 4 h, in which based on 100 weight parts of $In_2O_3$ and $SnO_2$, the amount of the ethanol was 200 weight parts; based on the total amount of $In_2O_3$ and $SnO_2$, the content of $In_2O_3$ was 5 mol %. The mixture thus obtained was dried at 120° C. in an air atmosphere for 4 h to obtain powders with a volume average particle diameter of 4.2 μm. The powders were calcined at 900° C. in an air atmosphere for 6 h, and the calcined product was grinded to obtain doped tin oxide particles having a volume average particle diameter of 1.2 μm. It was tested that the content of $In_2O_3$ in the doped tin oxide was 5 mol %.

Comparative Example 8

The present example provides a method for metalizing a polymer substrate and a polymer article prepared thereof. The method includes substantially the same steps as those in Example 6, with the exception that the mixture was formed by PEEK, 5 mol % In-doped $SnO_2$, calcium silicate fiber, antioxidant 1076 and polyethylene wax having a weight ratio of 100:10:10:0.2:0.1 (instead of a mixture formed by PC, PEEK, $Cu_2(PO_4)(OH)$, calcium silicate fiber, antioxidant 1076 and polyethylene wax having a weight ratio of 70:30:10:10:0.2:0.1) in the step 1).

Example 7

The present example provides a method for metalizing a polymer substrate and a polymer article prepared thereof. The method includes substantially the same steps as those in Example 6, with the exception that 5 mol % Sb-doped $SnO_2$ was used instead of 5 mol % In-doped $SnO_2$ in the step 1). The 5 mol % Sb-doped $SnO_2$ was prepared with the following steps. $SnO_2$ was grinded together with $Sb_2O_3$ and ethanol in a ball mill for 4 h, in which based on 100 weight parts of $Sb_2O_3$ and $SnO_2$, the amount of the ethanol was 200 weight parts; based on the total amount of $Sb_2O_3$ and $SnO_2$, the content of $Sb_2O_3$ was 5 mol %. The mixture thus obtained was dried at 120° C. in an air atmosphere for 4 h to obtain powders with a volume average particle diameter of 4.2 μm. The powders were calcined at 900° C. in an air atmosphere for 6 h, and the calcined product was grinded to obtain doped tin oxide particles having a volume average particle diameter of 1.2 μm. It was tested that the content of $Sb_2O_3$ in the doped tin oxide was 5 mol %.

Example 8

The present example provides a method for metalizing a polymer substrate and a polymer article prepared thereof. The method includes substantially the same steps as those in Example 6, with the exception that 5 mol % V-doped $SnO_2$ was used instead of 5 mol % In-doped $SnO_2$ in the step 1). The 5 mol % V-doped $SnO_2$ was prepared with the following steps. $SnO_2$ was grinded together with $V_2O_5$ and ethanol in a ball mill for 4 h, in which based on 100 weight parts of $V_2O_5$ and $SnO_2$, the amount of the ethanol was 200 weight parts; based on the total amount of $V_2O_5$ and $SnO_2$, the content of V$_2$O$_5$ was 5 mol %. The mixture thus obtained was dried at 120° C. in an air atmosphere for 4 h to obtain powders with a volume average particle diameter of 4.2 μm. The powders were calcined at 900° C. in an air atmosphere for 6 h, and the calcined product was grinded to obtain doped tin oxide particles having a volume average particle diameter of 1.2 μm. It was tested that the content of V$_2$O$_5$ in the doped tin oxide was 5 mol %.

Example 9

The present example provides a method for metalizing a polymer substrate and a polymer article prepared thereof. The method includes substantially the same steps as those in Example 6, with the exception that 5 mol % Mo-doped SnO$_2$ was used instead of 5 mol % In-doped SnO$_2$ in the step 1). The 5 mol % Mo-doped SnO$_2$ was prepared with the following steps. SnO$_2$ was grinded together with MoO$_3$ and ethanol in a ball mill for 4 h, in which based on 100 weight parts of MoO$_3$ and SnO$_2$, the amount of the ethanol was 200 weight parts; based on the total amount of MoO$_3$ and SnO$_2$, the content of MoO$_3$ was 5 mol %. The mixture thus obtained was dried at 120° C. in an air atmosphere for 4 h to obtain powders with a volume average particle diameter of 4.2 μm. The powders were calcined at 900° C. in an air atmosphere for 6 h, and the calcined product was grinded to obtain doped tin oxide particles having a volume average particle diameter of 1.2 μm. It was tested that the content of MoO$_3$ in the doped tin oxide was 5 mol %.

Example 10

The present example provides a method for metalizing a polymer substrate and a polymer article prepared thereof. The method includes substantially the same steps as those in Example 1, with the exception that the mixture was formed by poly(butylene terephthalate), 12 mol % Mo-doped SnO$_2$, antioxidant 1076, and polyethylene wax having a weight ratio of 70:30:10:0.2 (instead of a mixture formed by poly (hexamethylene adipamide), 10 mol % Sb-doped SnO$_2$, antioxidant 1076 and EVA wax having a weight ratio of 100:10:0.2:0.1) in the step 1). The 12 mol % Mo-doped SnO$_2$ was prepared with the following steps. SnO$_2$ was grinded together with MoO$_3$ and ethanol in a ball mill for 4 h, in which based on 100 weight parts of MoO$_3$ and SnO$_2$, the amount of the ethanol was 200 weight parts; based on the total amount of MoO$_3$ and SnO$_2$, the content of MoO$_3$ was 12 mol %. The mixture thus obtained was dried at 80° C. in an air atmosphere for 4 h to obtain powders with a volume average particle diameter of 3.1 μm. The powders were calcined at 920° C. in an air atmosphere for 4 h, and the calcined product was grinded to obtain doped tin oxide particles having a volume average particle diameter of 1.6 μm. It was tested that the content of MoO$_3$ in the doped tin oxide was 12 mol %.

TABLE 1

|  | Water contact angle (°) | Plating speed (μm/h) | Adhesion Grade |
| --- | --- | --- | --- |
| Example 1 | 141.2 | 6.3 | 5B |
| Example 2 | 121.5 | 5.2 | 4B |
| Comparative Example1 | 102.3 | 3.2 | 1B |
| Comparative Example2 | 105.3 | 1.5 | 3B |
| Comparative Example3 | 111.2 | 1.7 | 3B |
| Comparative Example4 | 110.3 | 1.6 | 3B |
| Comparative Example5 | 105.2 | 2.3 | 1B |
| Comparative Example7 | 53.8 | 3.2 | 2B |
| Example 3 | 120.1 | 4.1 | 3B |
| Example 4 | 125.2 | 5.3 | 4B |
| Example 5 | 136.6 | 5.8 | 4B |
| Example 6 | 127.2 | 4.6 | 4B |
| Comparative Example8 | 105.2 | 1.3 | 1B |
| Example 7 | 138.5 | 5.8 | 5B |
| Example 8 | 133.8 | 5.6 | 4B |
| Example 9 | 132.8 | 5.5 | 4B |
| Example 10 | 136.4 | 5.8 | 4B |

As can be concluded from Table 1, with the method for metalizing a polymer substrate according to embodiments of the present disclosure, metal layers may be formed on the surface of the polymer substrate by chemical plating. Under the same condition, the plating speed is faster and the adhesion between the metal layer and the polymer substrate is stronger using the method according to embodiments of the present disclosure, compared to conventional methods.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for metalizing a polymer substrate, comprising:
   providing a polymer substrate having a base polymer and at least one metal compound dispersed in the base polymer, the base polymer comprising a polymer, and the at least one metal compound comprising a tin oxide doped with at least one doping element selected from vanadium, antimony, indium, and molybdenum;
   irradiating a surface of the polymer substrate with an energy beam such that a water contact angle of the surface of the polymer substrate is at least 120°; and
   performing chemical plating on the surface of the polymer substrate.

2. The method according to claim 1, wherein the polymer substrate is provided by molding a mixture of the base polymer and the at least one metal compound.

3. The method according to claim 1, wherein based on the total weight of the polymer substrate, the content of the at least one metal compound is about 0.1 wt % to about 30 wt %.

4. The method according to claim 1, wherein based on the total amount of the doped tin oxide, the amount of the doping element calculated by oxides is about 0.1 mol % to about 15 mol %.

5. The method according to claim 1, wherein the irradiating comprises irradiating the surface of the polymer substrate with an energy beam such that the water contact angle of the surface of the polymer substrate is at least 130°.

6. The method according to claim 5, wherein the irradiating comprises irradiating the surface of the polymer substrate with an energy beam such that the water contact angle of the surface of the polymer substrate is about 130° to about 160°.

7. The method according to claim 1, wherein the energy beam comprises at least one of a laser, an electron beam, and an ion beam.

8. The method according to claim 7, wherein the laser has a wavelength of about 157 nm to about 10.6 μm.

9. The method according to claim 7, wherein the laser has a power of about 10 W to about 20 W.

10. The method according to claim 7, wherein the laser has a scanning speed of about 500 mm/s to about 8000 mm/s.

11. The method according to claim 1, wherein based on the total weight of the base polymer, the content of the polymer in a backbone is at least 50 wt %.

12. The method according to claim 1, further comprising cleaning the surface of the polymer substrate before chemical plating.

13. The method according to claim 1, wherein the polymer comprises a polyester and/or a polyamide.

14. The method according to claim 1, wherein the polymer comprises an ester group in a backbone.

15. The method according to claim 1, wherein the polymer comprises an amide group in a backbone.

16. The method according to claim 1, wherein the polymer comprises an ester and amide group in a backbone.

17. A method for metalizing a polymer substrate, comprising:
providing a polymer substrate having a base polymer and at least one metal compound dispersed in the base polymer;
irradiating a surface of the polymer substrate with an energy beam such that a water contact angle of the surface of the polymer substrate is at least 120°; and
performing chemical plating on the surface of the polymer substrate.

18. A method of claim 17, wherein the at least one metal compound comprises a tin oxide doped with at least one doping element selected from vanadium, antimony, indium, and molybdenum and the base polymer comprises a polymer selected from an ester group, an amide group, and an ester and amide combination group.

19. A method of claim 17, wherein the irradiating comprises irradiating the surface of the polymer substrate with an energy beam such that the water contact angle of the surface of the polymer substrate is about 130° to about 160°.

* * * * *